Oct. 21, 1952 — W. P. GALLAGHER — 2,615,069
ELECTRIC MOTOR CONSTRUCTION
Filed Dec. 14, 1949 — 3 Sheets-Sheet 1
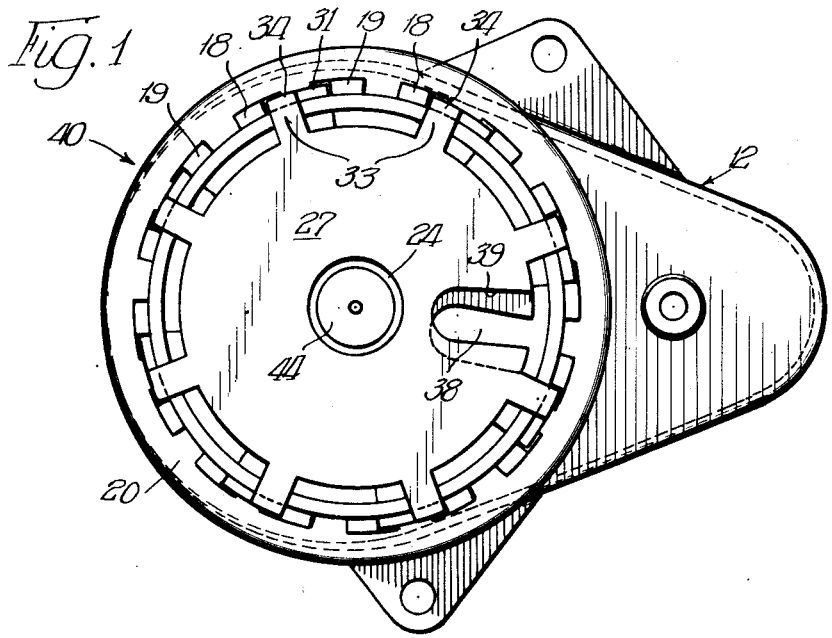
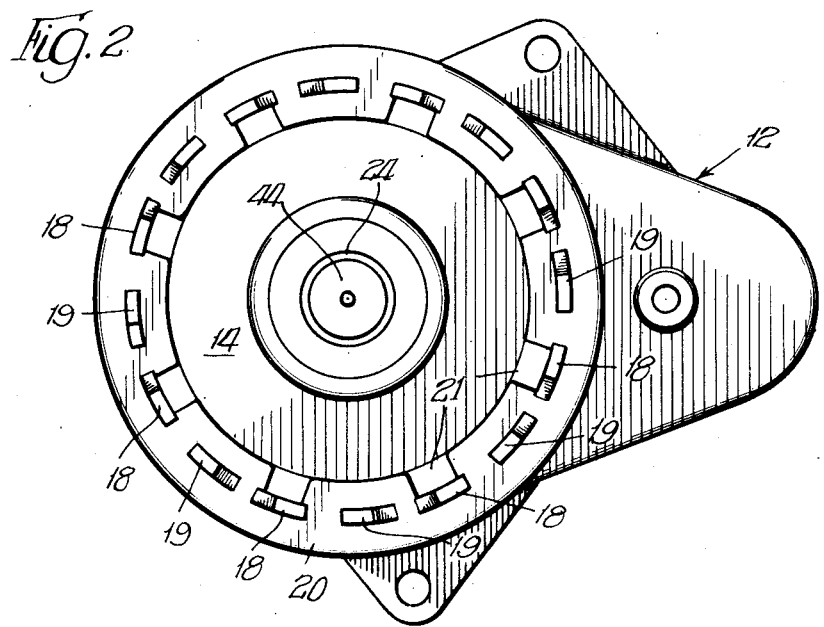
INVENTOR.
William P. Gallagher,
BY
Brown, Jackson, Boettcher Leimer
Atty.

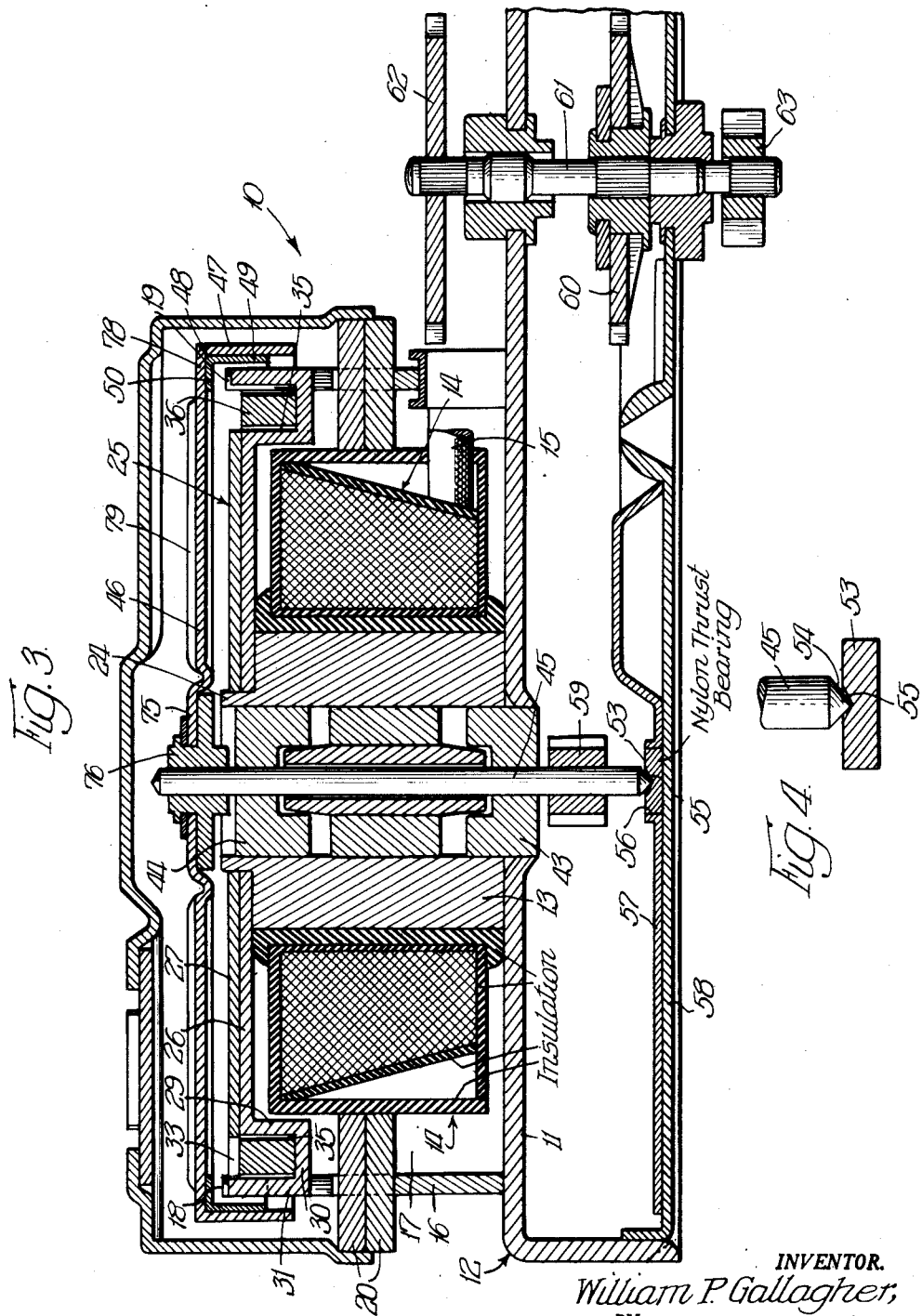

Oct. 21, 1952 W. P. GALLAGHER 2,615,069
ELECTRIC MOTOR CONSTRUCTION
Filed Dec. 14, 1949
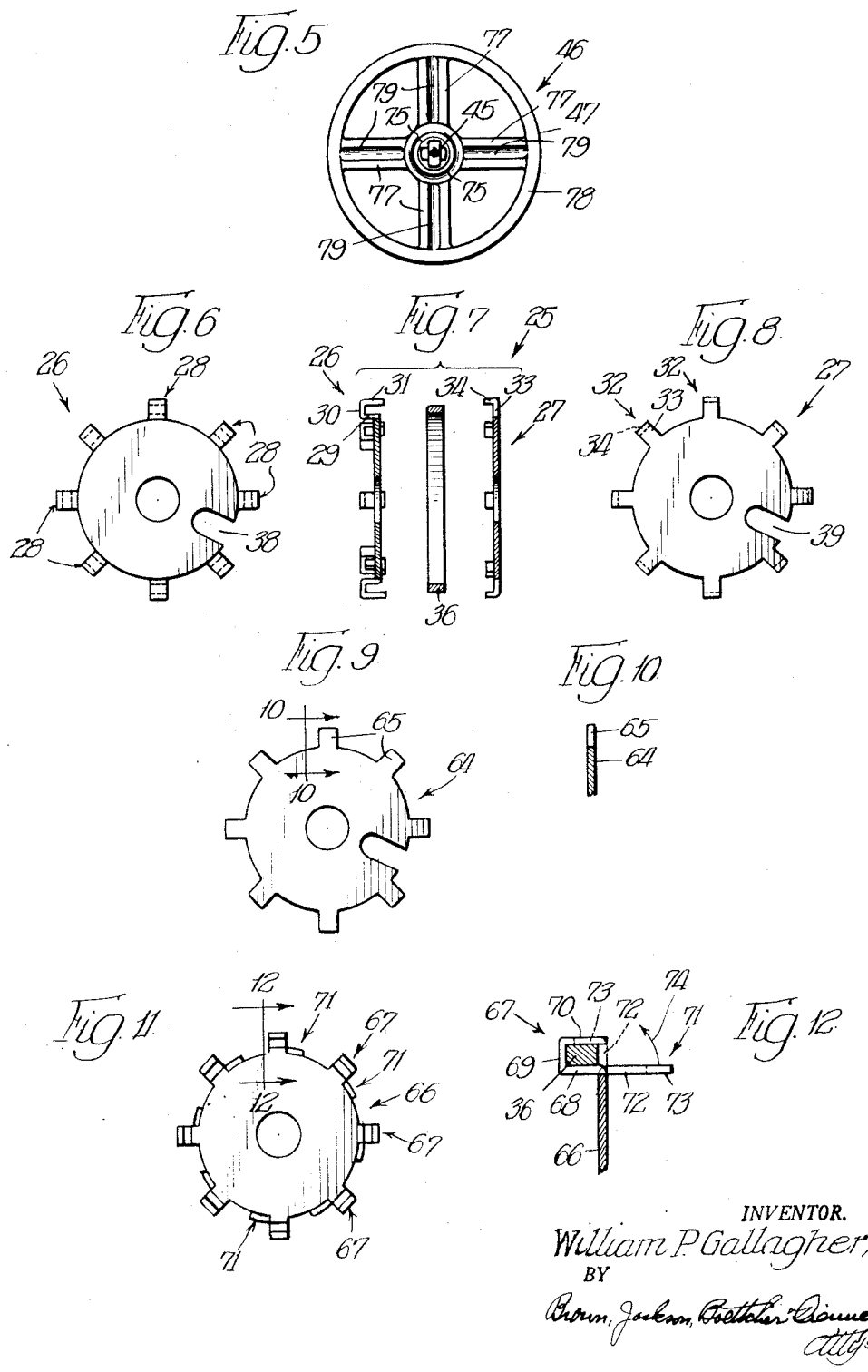

Patented Oct. 21, 1952

2,615,069

UNITED STATES PATENT OFFICE 2,615,069

ELECTRIC MOTOR CONSTRUCTION

William P. Gallagher, Chicago, Ill., assignor to International Register Company, Chicago, Ill., a corporation of Illinois Application December 14, 1949, Serial No. 132,958

12 Claims. (Cl. 172—278)

1

This invention relates, generally, to the construction of electric motors, and it has particular relation to relatively small synchronous motors of the shaded pole type.

Among the objects of this invention are: To provide a compact, efficient, economical, and high torque self-starting synchronous motor; to reduce the length of a synchronous basket type motor and the eddy current losses therein; to accomplish these objects by locating the shading ring for the field plates at one end of the core carrying the winding so as to be axially coextensive therewith and in a position where a minimum of eddy current is induced therein; to employ a rotor whose radius is greater than the length of the core or the distance between the bearings therefor and to reduce bearing wear and noise; to support the rotor endwise of its bearings against the thrust applied thereto by the magnetic field generated by the winding; to provide the rotor with an annular magnetic section and a radial magnetic section to facilitate generation of torque and end thrust; and to employ a thrust bearing of nylon or like material against which the rotor shaft bears for holding the rotor in predetermined axial position when running.

Other objects of this invention will, in part, be obvious and in part appear hereinafter.

This invention is disclosed in the embodiments thereof shown in the accompanying drawings, and it comprises the features of construction, combination of elements and arrangement of parts which will be exemplified in the constructions hereinafter set forth and the scope of the application of which will be indicated in the appended claims.

For a more complete understanding of the nature and scope of this invention, reference can be had to the accompanying drawings, in which:

Figure 1 is a top plan view of a stator construction in which the present invention is incorporated;

Figure 2 is a view, similar to Figure 1, but showing the stator construction with the field plate assembly removed, this figure and the preceding figure showing an actual motor construction at double scale;

Figure 3 is a vertical sectional view through a motor construction of the present invention, the scale being four times actual size;

Figure 4 is a view, at a greater enlarged scale, showing the relationship between one end of the rotor shaft and the nylon thrust bearing;

Figure 5 is a top plan view of a rotor at full

2 scale which may be employed in the motor shown in Figure 3;

Figure 6 is a view, in side elevation, of the inner magnetic field plate, the showing being at full scale;

Figure 7 is a sectional view of the field plate assembly and shading ring shown in disassembled relation;

Figure 8 is a view in side elevation of the outer magnetic field plate;

Figure 9 is a view, similar to Figure 8, and showing a modified form of outer magnetic field plate;

Figure 10 is a detail sectional view taken along the line 10—10 of Figure 9;

Figure 11 is a view, in side elevation, of a modified form of field plate which can be employed in lieu of the two field plates shown in Figures 6, 7, and 8; and Figure 12 is a detail sectional view, taken along the line 12—12 of Figure 11.

Referring now particularly to Figure 3 of the drawings, it will be observed that the reference character 10 designates, generally, a synchronous shaded pole motor in which the present invention is embodied. The motor 10 includes a plate 11 of magnetic material which forms the back and sides of a gear case that is indicated, generally, at 12. It will be noted that the magnetic plate 11 extends radially from an annular magnetic core 13 to which it is secured by spot welding or staking. Surrounding the core 13 is a winding 14 having conductors connected thereto, one being shown at 15, for connection to a suitable source of alternating current, such as a 120 volt 60 cycle source. A magnetic field ring 16 surrounds the core 13 and is secured to the plate 11 by welding or staking. The field ring 16 is spaced from the winding 14 so as to provide an annular space 17 therebetween. It will be noted that the radius of the field ring 16 is greater than the length of the core 13.

The field ring 16 forms a part of the magnetic circuit around the winding 14 and at its outer end it has unshaded pole tips 18 and shaded pole tips 19 which extend to the outer end of the core 13. Shading rings 20 of copper or aluminum interfit with the pole tips 18 and 19, as shown more clearly in Figure 2, and are provided with radial slots 21 extending inwardly from the unshaded pole tips 18. Portions of the shading rings 20 entirely surround the shaded pole tips 19 to produce the flux lag therein in accordance with well known practice.

The core 13 has a reduced diameter and section 24 for receiving a shaded field plate assembly that is indicated, generally, at 25 and is shown in more detail in Figure 7 of the drawings. The field plate assembly 25 includes an inner magnetic field plate 26 and an outer magnetic field plate 27 which are juxtaposed as shown more clearly in Figure 3. The inner magnetic field plate 26 has pole tips 28 each of which, as shown in Figure 7, includes an axial section 29 extending from the plate 26 over the winding 14 and toward the magnetic plate 11. Continuing from the inner end of the axial section 29 is a radial section 30 which terminates in an axial end section 31.

Likewise the outer magnetic field plate 27 is provided with pole tips which are indicated, generally, at 32. Each of the pole tips 32 includes a radial section 33 and an axial end section 34.

Now it will be observed that the pole tips 28 and 32 together define an annular space 35, Figure 3, in which a shading ring 36 of copper or aluminum is positioned. The shading ring 36 is provided for the purpose of making the magnetic flux in the pole tips 32 lag behind the flux in the pole tips 28 so as to provide a shifting magnetic field. Radial slots 38 and 39 are employed in the field plates 26 and 27 for the purpose of reducing eddy current flow therein.

The motor construction thus far described constitutes the stator construction which is indicated, generally, at 40 in Figure 1 of the drawings. The stator construction 40 is a subassembly of the complete motor construction shown in Figure 3 and indicated by the reference character 10.

By constructing the field plate assembly 25 in a manner described hereinbefore, the shading ring 36 is located so that it is axially coextensive with the upper end of the winding 14 and also with the upper end of the core 13. It is positioned in the annular space 17 between the field ring 16 and the winding 14 and thus the overall height of the stator construction 40 is substantially the same as the length of the annular magnetic core 13. This reduces the overall height of the motor which is a highly desirable feature in this particular basket type of motor construction. As shown more clearly in Figure 1, the pole tips 18 and 19 extending from the field ring 16 and the oppositely extending axial end sections 31 and 34 of the inner and outer field plates 26 and 27 are coextensive. That is they are located generally in the same annular position so that, in conjunction with the shading rings 20 and 36, they provide a shifting magnetic field in a narrow annular path therearound.

Referring now to Figure 3 of the drawings, it will be noted that bearings 43 and 44 are located in the ends of the annular magnetic core 13. The bearings 43 and 44 are employed to support a shaft 45 which, at its upper end, carries a rotor 46 which may be formed of non-magnetic material such as aluminum. The rotor 46 also is shown in Figure 5. It has an annular rim 47 which overlies the coextensive end portions of the pole tips 18 and 19 of the field ring 16 and the pole tips 28 and 32 of the field plates 26 and 27. Telescoped with the annular rim 47 is a rotor ring 48 of magnetic material having a generally L-shaped cross section. One arm 49 of the rotor ring 48 is coextensive with the annular rim 47 of the rotor 46 while the other arm 50 extends radially inwardly therefrom. It will be observed that the rotor ring 48 of magnetic material is located in the narrow band of shifting magnetic flux previously described on energization of the winding 14. The provision of the radially extending arm 50 of the rotor ring 48 causes the ring 48 and rotor 46 to be attracted toward the winding 14 when it is energized. The rotor 46 and rotor ring 48 are held in predetermined spaced relation above the stator construction 40 by a thrust bearing 53 which is preferably in the form of a nylon disc. The lower tapered end 54 of the shaft 45 engages the upper surface of the thrust bearing 53 and forms a depression 55 therein which is shown somewhat exaggerated in size in Figure 4 of the drawings. Initially the thrust bearing 53 has a flat upper surface, the depression 55 being worn therein by the lower tapered end 54 of the shaft 45.

By providing the thrust bearing 53 at the lower end of the shaft 45, it is supported against axial thrust and also an additional bearing support is provided which materially reduces the wear on the lower bearing 43 and hence reduces noise incident thereto. Because of the short length of the annular magnetic core 13 with respect to the radius of the rotor 46, an unsatisfactory mechanical support for the rotor 46 is provided when only the bearings 43 and 44 are employed. The addition of the thrust bearing 53 provides further bearing support for the shaft 45 and thus this mechanical disadvantage is overcome.

Another advantage of the use of the thrust bearing 53 is to reduce the necessity for holding extremely close tolerances in the construction of the parts making up the stator 40, particularly with reference to the ends of the pole tips 18, 19, 28 and 32. The reason for this is that the rotor 46 and rotor ring 48 are always held in a predetermined position in the core 13 on energization of the winding 14. It is unnecessary to provide sufficient clearance to permit the rotor ring 48 to assume a position of minimum reluctance in the shifting annular magnetic field as is the case when the thrust bearing 53 is not employed.

Any suitable means can be used for stationarily mounting the thrust bearing 53. As shown in Figure 3 it may be mounted in a suitable opening 56 in a plate 57 that is carried by a cover plate 58 which forms a closure for the gear case 12.

Just above the thrust bearing 53 and below the bearing 43 a pinion 59 may be fast on the shaft 45. The pinion 59 is arranged to drive, through a gear train not shown, a gear wheel 60 that is fast on a shaft 61 which is rotatably mounted on the gear case 12 and the cover plate 58. The shaft 61 may have a gear wheel 62 and a pinion 63 fast thereon to drive a suitable mechanism such as a time switch, clock mechanism, or the like.

In Figures 9 and 10 of the drawings, there is illustrated at 64 an alternate form of outer magnetic field plate which may be employed in lieu of the field plate 27 shown in Figure 8 and described hereinbefore. The difference resides in the provision of radial pole tips 65 which do not have the axial end sections corresponding to the sections 34 which are provided at the ends of the pole tips 32. Slightly less torque is provided when the magnetic field plate 64 is employed than is obtained when the field plate 27 is used. However, for certain applications, the field plate 64 provides a satisfactory construction.

In Figures 11 and 12 of the drawings, there is illustrated a field plate 66 which can be employed in lieu of the inner and outer field plates 26 and 27. The field plate 26 has pole tips 67 which correspond to the pole tips 28. Each of the pole tips 67 has an axial section 68, a radial section 69, and an axial end section 70 which correspond respectively to the sections 29, 30 and 31 of the pole tips 28. In addition, the field plate 66 has pole tips 71 which correspond to the pole tips 32 on the outer field plate 27. Initially the pole tips 71 are formed so as to extend at right angles to the central portion of the field plate 66 as shown in Figure 12. Each has a radial section 72 and an axial end section 73 corresponding to the sections 33 and 34, respectively, of the pole tips 32. After the shading ring 36 is located as shown in Figure 12, the pole tips 71 are bent in the direction indicated by the arrow 74 so that the section 72 extends radially while the section 73 extends axially and is coextensive with the axial end section 70 of the pole tips 67 but projects in the opposite direction. It will be understood that the field plate 66 can be employed in lieu of both of the field plates 26 and 27 if desired.

While the non-magnetic rotor 46 may have a central solid disc portion extending from the shaft 45 to the rim 47, it is preferably constructed as shown in Figures 3 and 5 to have a central hub portion 75 which is frictionally gripped by a sleeve member 76 that has a press fit with shaft 45. Four flat spokes 77 extend radially from the hub portion 75 to a rim 78 which joins their outer ends and extends radially, the annular rim 47 extending axially therefrom at right angles. This provides an L-shaped cross-section in which the rotor ring 48 can be nested. Each of the flat spokes 77 is longitudinally grooved at 79 to increase its resistance to bending. By providing the spokes 77 instead of a solid disc construction, the diaphragm effect of the latter is avoided and there is a marked reduction in noise.

Since certain further changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. An electric motor construction comprising, in combination, a magnetic core, a winding on said core, a magnetic plate extending radially from one end of said core; a magnetic field ring extending from said plate, axially coextensive with said core, and having spaced pole tips extending therefrom; field plate means extending radially from the other end of said core with the central plate portion extending the major part of the distance between said core and said field ring and having two sets of pole tips extending radially therefrom in pairs with their outer ends extending in opposite axial directions between and coextensive with adjacent pairs of pole tips of said field ring, the inner portions of one set of pole tips from said field plate means extending axially therefrom toward said magnetic plate and overlying said winding whereby the radially outwardly extending portions thereof are axially spaced from the radially outwardly extending portions of the other set of pole tips and together define an annular space encircling and coextensive with the space occupied by said winding, a shading ring in said annular space, a bearing at each end of said core, a shaft rotatable in said bearings with its ends projecting therebeyond, a rotor carried by one end of said shaft at said other end of said core including a rotor ring of magnetic material having an L-shaped cross section with one arm overlying said coextensive ends of said pole tips and the other arm extending radially inwardly whereby said rotor is attracted toward said winding on energization thereof, and a thrust bearing stationarily mounted at one end of said core and cooperating with said shaft for holding the same and said rotor in fixed axial position when said winding is energized.

2. An electric motor construction comprising, in combination, a magnetic core, a winding on said core, a magnetic plate extending radially from one end of said core; a magnetic field ring extending from said plate, axially coextensive with said core, and having spaced pole tips extending therefrom; a pair of juxtaposed field plates extending radially from the other end of said core with the central plate portions extending outwardly beyond said winding and having pole tips extending radially therefrom in pairs with their outer ends extending in opposite axial directions between and coextensive with adjacent pairs of pole tips of said field ring, the inner portions of the pole tips from the inner field plate extending axially therefrom toward said magnetic plate and overlying said winding whereby the radially outwardly extending portions thereof are axially spaced from the radially outwardly extending portions of the pole tips of the outer field plate and together define an annular space encircling and coextensive with the space occupied by said winding, a shading ring in said annular space, a bearing at each end of said core, a shaft rotatable in said bearings with its ends projecting therebeyond, a rotor carried by one end of said shaft at said other end of said core including a rotor ring of magnetic material having an L-shaped cross section with one arm overlying said coextensive ends of said pole tips and the other arm extending radially inwardly whereby said rotor is attracted toward said winding on energization thereof, and a thrust bearing stationarily mounted at said one end of said core and forming a bearing support for the other end of said shaft and holding the same and said motor in fixed axial position when said winding is energized.

3. An electric motor construction comprising, in combination, an annular magnetic core, a winding on said core, a magnetic plate extending radially from one end of said core; a magnetic field ring having a radius greater than the length of said core, extending from said plate, axially coextensive with said core, spaced from said winding, and having spaced pole tips extending to the other end of said core; a shading ring carried by said field ring with portions extending radially outwardly and inwardly thereof into the space around said winding and surrounding alternate ones of said pole tips, a pair of juxtaposed field plates extending radially from said other end of said core and having a radial slot in each to limit eddy current flow and pole tips extending radially therefrom in pairs with their outer ends extending in opposite axial directions between and coextensive with adjacent pairs of pole tips of said field ring, the inner portions of the pole tips from the inner field plate extending axially therefrom toward said magnetic plate whereby the radially outwardly extending portions thereof are axially spaced from the radially outwardly extending portions of the pole tips of the outer field plate and together define an annular space encircling and coextensive with the space occupied by said winding, a shading ring in said annular space, a bearing at each end of said annular core, a shaft rotatable in said bearings with its ends projecting therebeyond, a non-magnetic rotor carried by one end of said shaft at said other end of said core having an annular rim overlying the coextensive ends of said pole tips, a rotor ring of magnetic material telescoped with said rim and having an L-shaped cross section with one arm overlying said coextensive ends of said pole tips and the other arm extending radially inwardly whereby said rotor and rotor ring are attracted toward said winding on energization thereof, and a thrust bearing stationarily mounted at said one end of said core and forming a bearing support for the other end of said shaft and holding the same and said rotor and rotor rim in fixed axial position when said winding is energized.

4. The invention, as set forth in claim 3, wherein the thrust bearing is formed of nylon.

5. An electric motor construction comprising, in combination, an annular magnetic core, a winding on said core, a magnetic plate extending radially from one end of said core; a magnetic field ring having a radius greater than the length of said core, extending from said plate, axially coextensive with said core, spaced from said winding, and having spaced pole tips extending to the other end of said core; a shading ring carried by said field ring with portions extending radially outwardly and inwardly thereof into the space around said winding and surrounding alternate ones of said pole tips, a field plate extending radially from said other end of said core with the central plate portion extending the major part of the distance between said core and said field ring and having two sets of pole tips extending radially therefrom in pairs with their outer ends extending in opposite axial directions between and coextensive with adjacent pairs of pole tips of said field ring, the inner portions of one set of pole tips from said field plate extending axially therefrom toward said magnetic plate and overlying said winding whereby the radially outwardly extending portions thereof are axially spaced from the radially outwardly extending portions of the other set of pole tips and together define an annular space encircling and coextensive with the space occupied by said winding, a shading ring in said annular space, a bearing at each end of said annular core, a shaft rotatable in said bearings with its ends projecting therebeyond, a non-magnetic rotor carried by one end of said shaft at said other end of said core having an annular rim overlying the coextensive ends of said pole tips, a rotor ring of magnetic material telescoped with said rim and having an L-shaped cross section with one arm overlying said coextensive ends of said pole tips and the other arm extending radially inwardly whereby said rotor and rotor ring are attracted toward said winding on energization thereof, and a thrust bearing stationarily mounted at one end of said core and cooperating with said shaft for holding the same and said rotor and rotor rim in fixed axial position when said winding is energized.

6. An electric motor construction comprising, in combination, an annular magnetic core, a winding on said core, a magnetic plate extending radially from one end of said core; a magnetic field ring having a radius greater than the length of said core, extending from said plate, axially coextensive with said core, spaced from said winding, and having spaced pole tips extending to the other end of said core; a shading ring carried by said field ring with portions extending radially outwardly and inwardly thereof into the space around said winding and surrounding alternate ones of said pole tips, a pair of juxtaposed field plates extending radially from said other end of said core with the central plate portions extending outwardly beyond said winding and having pole tips extending radially therefrom in pairs with their outer ends extending between and the outer ends of the inner field plate pole tips coextensive with adjacent pairs of pole tips of said field ring, the inner portions of the pole tips from the inner field plate extending axially therefrom toward said magnetic plate and overlying said winding whereby the radially outwardly extending portions thereof are axially spaced from the radially outwardly extending portions of the pole tips of the outer field plate and together define an annular space encircling and coextensive with the space occupied by said winding, a shading ring in said annular space, a bearing at each end of said annular core, a shaft rotatable in said bearings with its end projecting therebeyond, a non-magnetic rotor carried by one end of said shaft at said other end of said core having an annular rim overlying the ends of said pole tips, a rotor ring of magnetic material telescoped with said rim and having an L-shaped cross section with one arm overlying said ends of said pole tips and the other arm extending radially inwardly whereby said rotor and rotor ring are attracted toward said winding on energization thereof, and a thrust bearing stationarily mounted at one end of said core and cooperating with said shaft for holding the same and said rotor and rotor rim in fixed axial position when said winding is energized.

7. A stator construction for an electric motor comprising in combination, a magnetic core, a winding on said core, a magnetic plate extending radially from one end of said core; a magnetic field ring extending from said plate, axially coextensive with said core, and having spaced pole tips extending therefrom; field plate means extending radially from the other end of said core with the central plate portion extending the major part of the distance between said core and said field ring and having two sets of pole tips extending radially therefrom in pairs with their outer ends extending in opposite axial directions between and coextensive with adjacent pairs of pole tips of said field ring, the inner portion of one set of pole tips from said field plate means extending axially therefrom toward said magnetic plate and overlying said winding whereby the radially outwardly extending portions thereof are axially spaced from the radially outwardly extending portions of the other set of pole tips and together define an annular space encircling and coextensive with the space occupied by said winding, and a shading ring in said annular space.

8. A stator construction for an electric motor comprising, in combination, a magnetic core, a winding on said core, a magnetic plate extending radially from one end of said core; a magnetic field ring extending from said plate, axially coextensive with said core, and having spaced pole tips extending therefrom; a pair of juxtaposed field plates extending radially from said other end of said core with the central plate portions extending outwardly beyond said winding and having pole tips extending radially therefrom in pairs with their outer ends extending in opposite axial directions between and coextensive with adjacent pairs of pole tips of said field ring, the inner portions of the pole tips from the inner field plate extending axially therefrom toward said magnetic plate and overlying said winding whereby the radially outwardly extending portions thereof are axially spaced from the radially outwardly extending portions of the pole tips of the outer field plate and together define an annular space encircling and coextensive with the space occupied by said winding, and a shading ring in said annular space.

9. A stator construction for an electric motor comprising in combination, a magnetic core, a winding on said core, a magnetic plate extending radially from one end of said core; a magnetic field ring extending from said plate, axially coextensive with said core, and having spaced pole tips extending to the other end of said core; a field plate extending radially from said other end of said core with the central plate portion extending the major part of the distance between said core and said field ring and having two sets of pole tips extending radially therefrom in pairs with their outer ends extending in opposite axial directions between and coextensive with adjacent pairs of pole tips of said field ring, the inner portions of one set of pole tips from said field plate extending axially therefrom toward said magnetic plate and overlying said winding whereby the radially outwardly extending portions thereof are axially spaced from the radially outwardly extending portions of the other set of pole tips and together define an annular space encircling and coextensive with the space occupied by said winding, and a shading ring in said annular space.

10. A stator construction for an electric motor comprising in combination, a magnetic core, a winding on said core, a magnetic plate extending radially from one end of said core; a magnetic field ring extending from said plate, axially coextensive with said core, and having spaced pole tips extending to the other end of said core; a pair of juxtaposed field plates extending radially from said other end of said core with the central plate portions extending outwardly beyond said winding and having pole tips extending radially therefrom in pairs with their outer ends extending between and the outer ends of the inner field plate pole tips coextensive with adjacent pairs of pole tips of said field ring, the inner portions of the pole tips from the inner field plate extending axially therefrom toward said magnetic plate and overlying said winding whereby the radially outwardly extending portions thereof are axially spaced from the radially outwardly extending portions of the pole tips of the outer field plate and together define an annular space encircling and coextensive with the space occupied by said winding, and a shading ring in said annular space.

11. A rotor for an electric motor comprising, in combination, a central hub portion for mounting on a shaft, a plurality of flat spokes extending radially from said hub portion, each spoke being longitudinally grooved to increase its resistance to bending, a rim joining the ends of said spokes and having a section extending at right angles thereto thereby providing an L-shaped cross-section, said hub portion, spokes and rim being formed integrally of non-magnetic material, and a rotor ring of magnetic material having an L-shaped cross-section nested in said rim.

12. A stator construction for an electric motor comprising in combination, a magnetic core, a winding on said core, a magnetic plate extending radially from one end of said core; a magnetic field ring extending from said plate, axially coextensive with said core, and having spaced pole tips extending therefrom; field plate means extending radially from the other end of said core and having pairs of pole tips extending therefrom coextensive and interfitting with adjacent pole tips of the field ring, said pole tips together defining an annular space encircling and coextensive with the space occupied by said winding, and a shading ring in said annular space cooperating with alternate pole tips from said plate means to shift the phase of the magnetic flux therein with respect to the flux in the other pole tips from said plate means.

WILLIAM P. GALLAGHER.

REFERENCES CITED

The following references are of record in the file of this patent:

UNITED STATES PATENTS

| Number | Name | Date |
|---|---|---|
| 1,916,909 | Stewart | July 4, 1933 |
| 1,933,590 | Holtz et al. | Nov. 7, 1933 |
| 1,962,770 | Holtz | June 12, 1934 |
| 1,977,184 | Haydon | Oct. 16, 1934 |
| 2,015,042 | Reinhart et al. | Sept. 17, 1935 |
| 2,140,365 | Lenehan | Dec. 13, 1938 |
| 2,305,963 | Hansen | Dec. 22, 1942 |
| 2,353,305 | Haydon | July 11, 1944 |
| 2,450,955 | Hansen et al. | Oct. 12, 1948 |
| 2,460,358 | Packard | Feb. 1, 1949 |
| 2,493,999 | Riley | Jan. 10, 1950 |
| 2,537,093 | Schlenker | Jan. 9, 1951 |